April 21, 1942.  D. C. PALM  2,280,349
PIPE SUPPORT
Filed Jan. 21, 1941
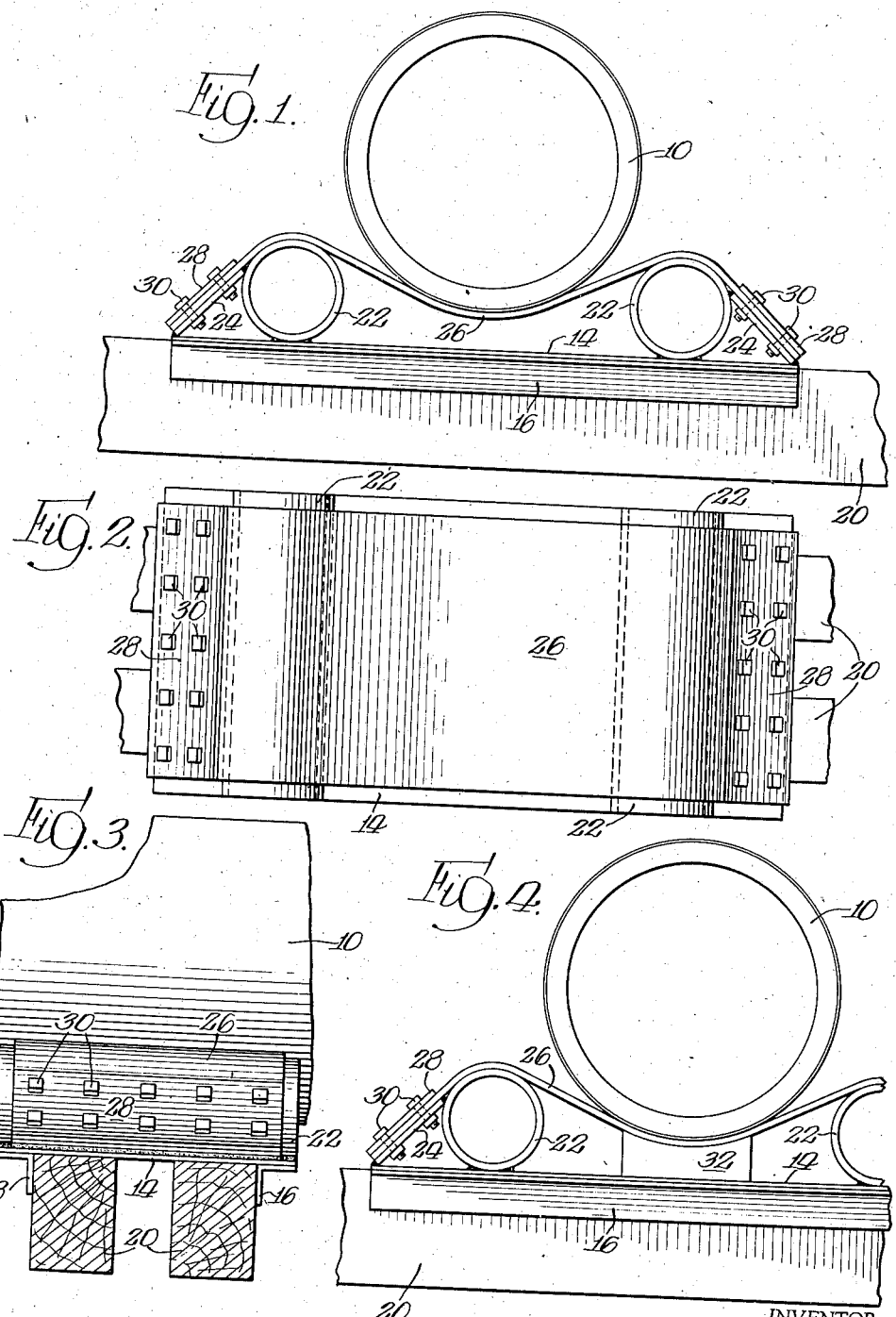
INVENTOR.
David C. Palm,
BY Bair & Freeman
Attys.

Patented Apr. 21, 1942

2,280,349

UNITED STATES PATENT OFFICE 2,280,349

PIPE SUPPORT

David C. Palm, Geneseo, Ill.

Application January 21, 1941, Serial No. 375,272

3 Claims. (Cl. 248—49)

The pipe used for cross-country pipe-lines is provided with a bituminous or similar coating to protect the metal from corrosion after the pipe is buried in the ground. This coating is easily damaged by abrasion, such as may occur when the pipe is moved over rough or sharp surfaces, or by high localized contact pressures, as when the pipe is supported on temporary structures in contact with relatively hard structural members which do not conform to the shape of the pipe.

Puncture of the protective coating at any point, of course, opens the way to corrosion at that point, and the pipe is no better than its weakest spot. It is therefore desirable to have means for supporting the lengths of pipe which will give adequate protection to the corrosion-resistant coating while the pipes are being joined above the trench.

It is an object of my invention to provide a pipe support in which the pipe rests on a flexible member which conforms to the surface of the pipe and which tends to center it along a certain line.

Another object is the provision of a pipe support in which the supporting forces are distributed over a substantial area of the pipe surface with such uniformity that high localized contact pressures are avoided.

A further object is to provide a suspension unit which can be easily handled and moved from place to place, and which can be rested on ordinary timbers across a pipe trench to form a complete support having the advantages pointed out above.

In the particular embodiment of my invention here illustrated, it is an object to provide a pipe supporting unit which can be constructed easily and economically from standard steel shapes.

A modified form of my invention described herein has as one of its objects the provision of a pipe support having a flexible pipe cradle in tension, and a resilient member in compression, each contributing to the support of the pipe.

With these and other objects in view, my invention consists in the construction, arrangement and combination of the various parts of my device whereby the objects contemplated are attained, as hereinafter more fully set forth, pointed out in my claims and illustrated in the accompanying drawing, in which:

Figure 1 is a front elevational view of a pipe support embodying my invention.

Figure 2 is a plan view thereof.

Figure 3 is a side elevational view thereof; and

Figure 4 is a view corresponding to Figure 1, but showing a modified form of my invention.

In the accompanying drawing I have used the reference numeral 10 to indicate the pipe to be supported, which may be two feet or more in diameter. The protective or corrosion-resistant coating is designated as 12.

The support has a base plate 14 on the underside of which are welded two angle bars, 16 and 18. The bars serve to give strength against bending under load, and also serve to locate timbers 20 which may be used to span the trench.

Welded to the base plate transversely to the angle bars 16 and 18, and spaced from the center line, are upstanding structural members 22, which may be lengths of pipe, as shown, or similar members with rounded upper surface. Extending from the outer edges of the base plate to the members 22, I provide perforated plates 24, so arranged that their top surfaces are tangent to the outer surfaces of the cylinders 22. The plates 24 are welded along their lower edges to the base plate 14, and along their upper edges to the cylinders 22.

A flexible member 26 is clamped against the plates 24 by plates 28 and bolts 30. The member 26 may consist of a length of heavy duty belting or similar material, passing over the cylinders 22 and extending across the space between, as seen in Figure 1. When the pipe 10 is supported in the manner shown in the figure, it is contacted solely by the member 26, which yields freely to conform to the surface of the pipe. The "hammock" character of the support has several important features. In the first place, because of its flexible nature, it has no hard or sharp edges which will cut or perforate the coating 12. Secondly, and closely related, is the fact that the supporting member 26 conforms to the surface of the pipe, so that the supporting forces are distributed over a substantial area with considerable uniformity; hence there are no high localized contact pressures which would result in damage to the coating. A third advantage arises from the fact that the pipe will normally assume a position in the middle of the hammock, as seen in Figure 1, since that is the lowest position it can assume. This means that when two supports such as the one described are used, one at each end of a length of pipe, there is a strong tendency for the pipe to center axially along a certain line, and the result is accomplished without the necessity of additional fixtures with hard surfaces engaging the pipe. The centering effect is of real value when the pipeline is being assembled, keeping the pipes in alignment without sacrificing the advantages of the flexible support.

In the preferred form as described above and as illustrated in Figures 1-3, the support element proper consists solely of the flexible member 26. Where very heavy loads are involved, however, or for other reasons, it may be desirable to provide a block of resilient material 32, of rubber or the like, interposed between the base plate 14 and the flexible member 26. Such an arrangement is shown in Figure 4, where it will be observed that the cradle or hammock member 26 is in tension, and the block 32 is in compression, both the tensional and compressional forces contributing to the support of the pipe. The advantages of the preferred form will still be obtained, but a given supporting unit would have somewhat increased load capacity by the addition of the resilient block, other factors remaining the same.

Some changes may be made in the construction and arrangement of the parts of my device without departing from the real spirit and purpose of my invention, and it is my intention to cover by my claims any modified forms of structure, or use of mechanical equivalents, which may be reasonably included within their scope.

I claim as my invention:

1. In a pipe support, a base plate, parallel angle bars on the underside of said plate adjacent opposite edges thereof, a pair of cylindrical members on top of said plate extending transversely to said angle bars and spaced between the ends of said plate and the center line, inclined plates, each fastened along one side to one end of said base plate, and fastened along an opposite side tangentially to one of said cylinders, and a flexible sheet extending between said cylinders and clamped at its ends to said inclined plates.

2. In a temporary support for a pipe with a soft outer covering, a base, two fixed uprights extending from said base, a band of pliable material suspended between said uprights, the bearing surface of said band on said pipe being sufficient to reduce the force per unit area below the value which would result in damage to the covering, said band being in tension when the pipe is rested thereon, and a resilient member interposed between the base and said band, said member being in compression when the pipe is rested on said band.

3. In a pipe support, a base plate, upright members thereon, spaced from the center line of said plate and having curved upper surfaces, a sheet of pliable material extending between said upright members and over the curved surfaces thereof, means for retaining the ends of said sheet in planes tangent to said curved surfaces, and a resilient member interposed between said base plate and the portion of said sheet between said upright members.

DAVID C. PALM.